March 26, 1940.   R. R. BLOSS   2,195,200
BRAKE FOR DRUMS
Filed June 1, 1937   5 Sheets-Sheet 2
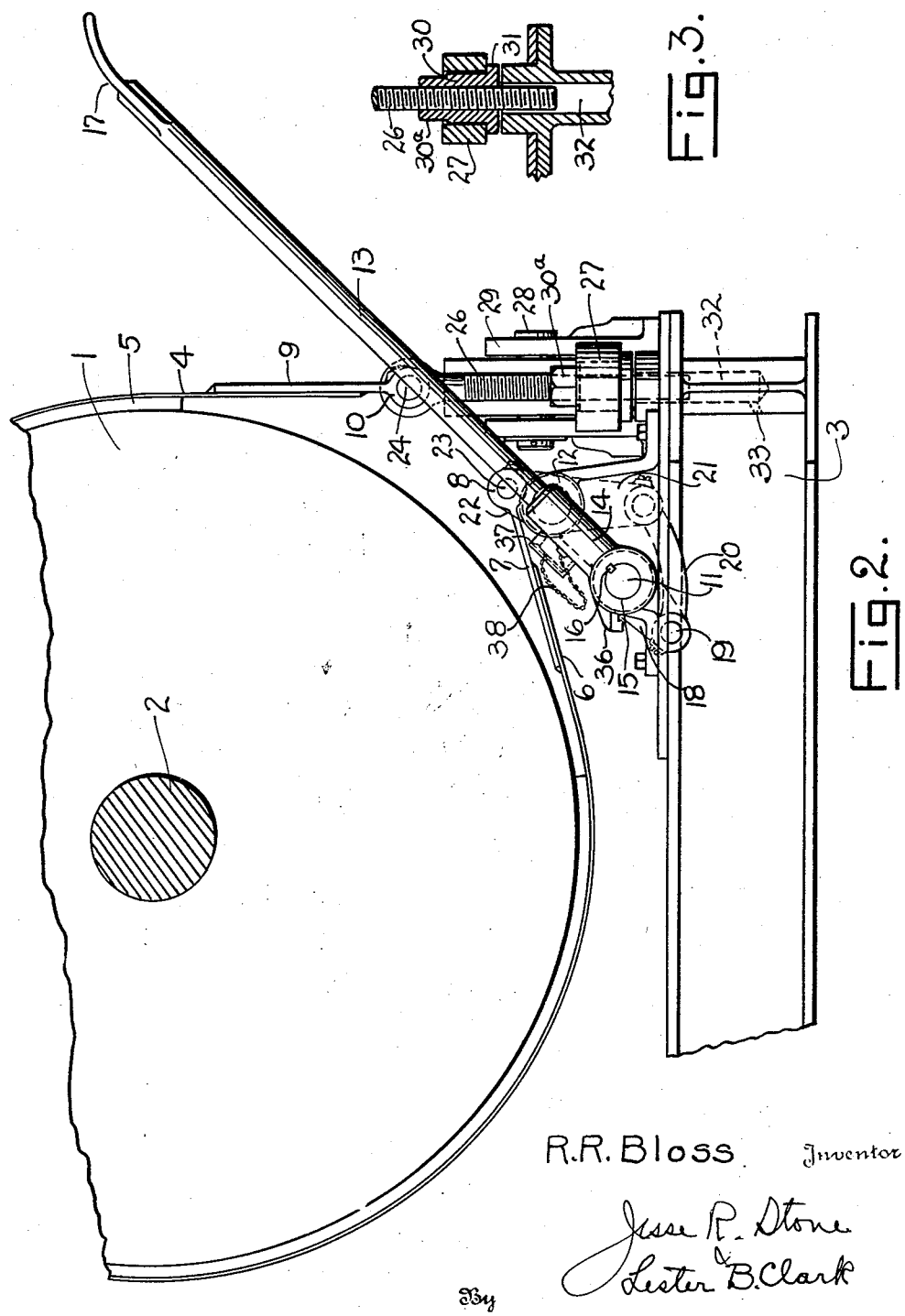
R. R. Bloss   Inventor
By  Jesse R. Stone
    Lester B. Clark
        Attorneys March 26, 1940.    R. R. BLOSS    2,195,200
BRAKE FOR DRUMS
Filed June 1, 1937    5 Sheets-Sheet 3
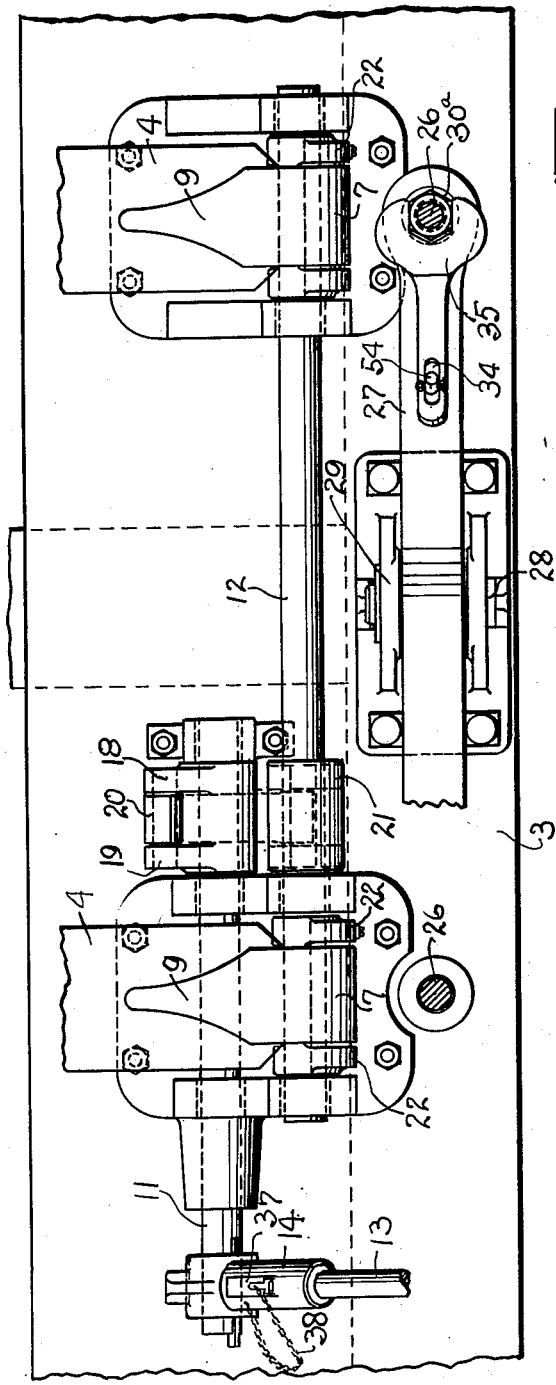
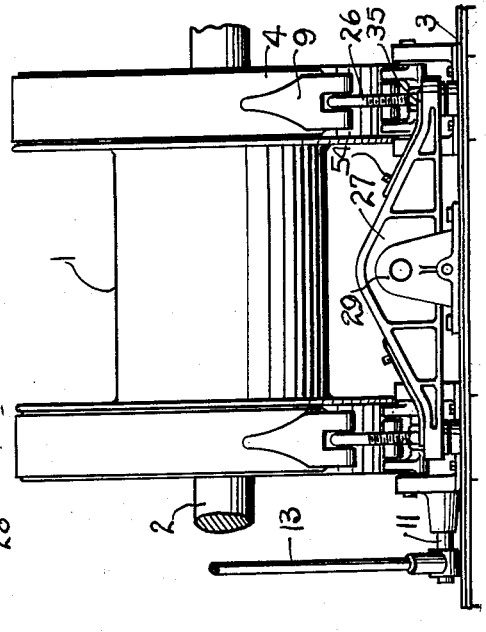
R. R. Bloss    Inventor
Jesse R. Stone
Lester B. Clark
By
Attorneys

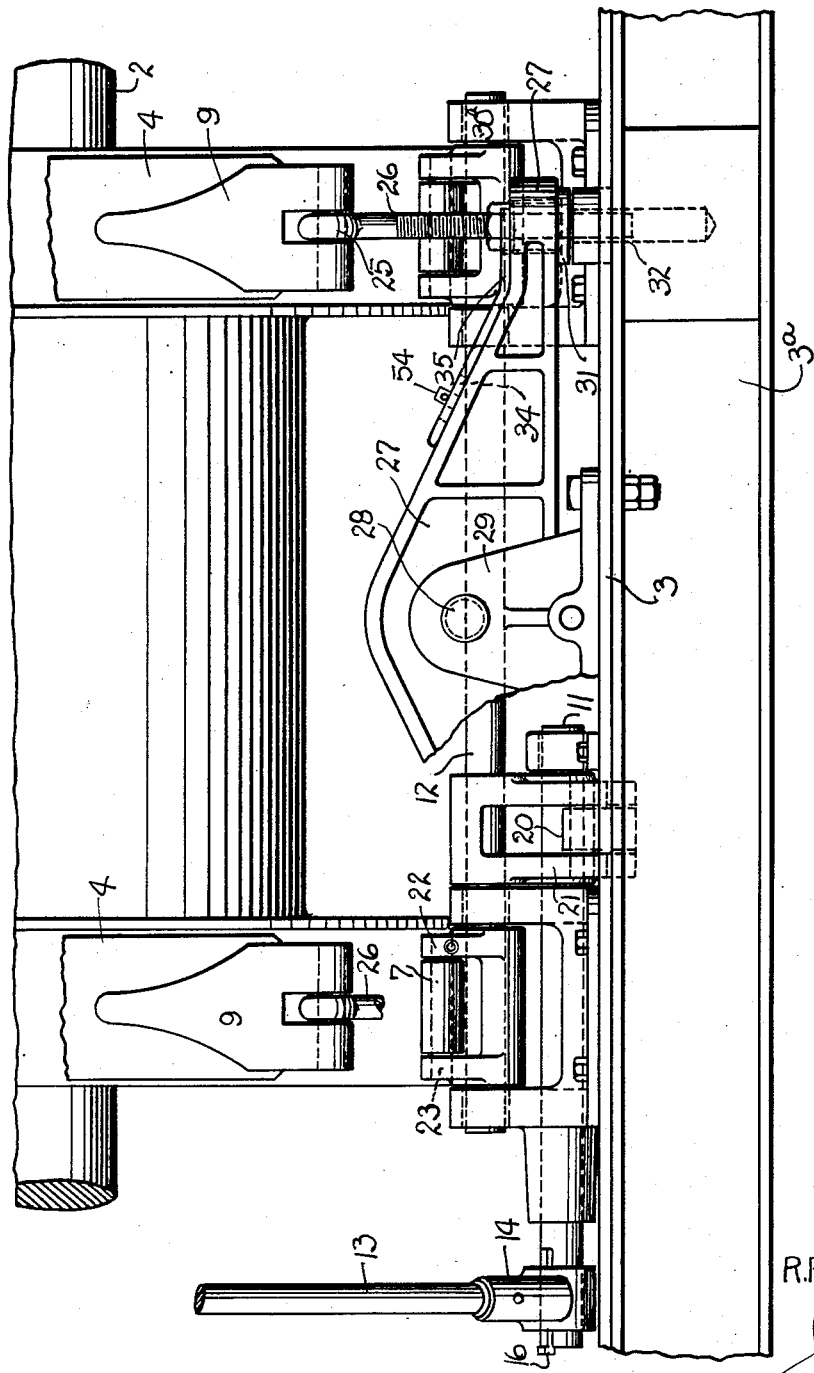

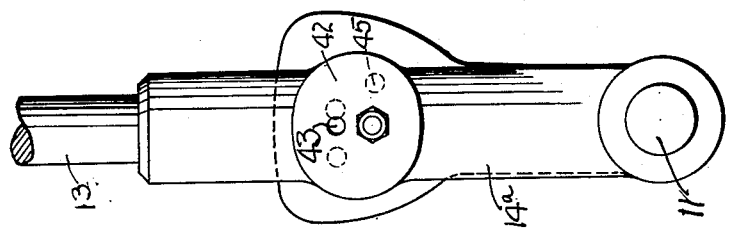
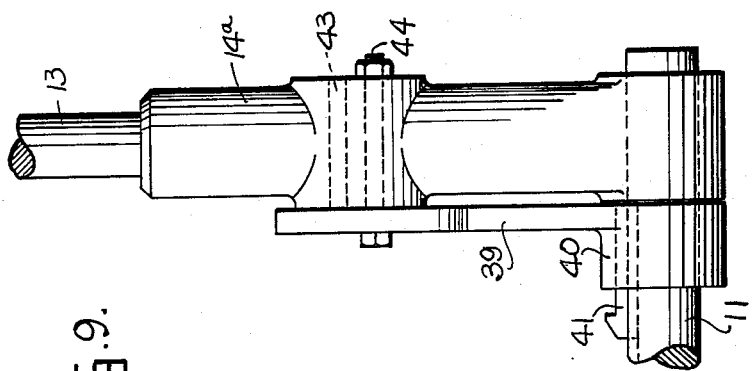
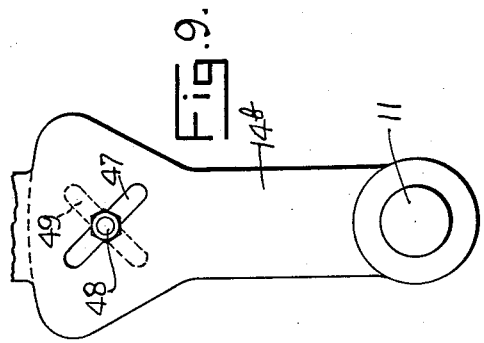
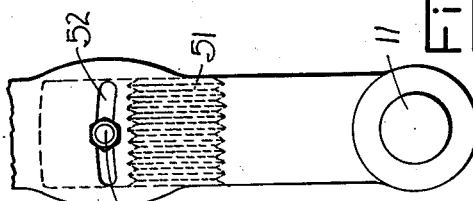
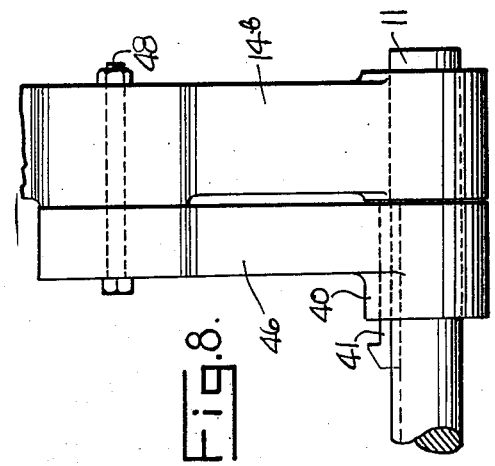
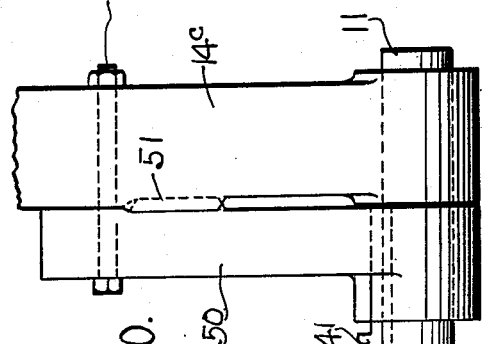

March 26, 1940.    R. R. BLOSS    2,195,200
BRAKE FOR DRUMS
Filed June 1, 1937    5 Sheets-Sheet 5
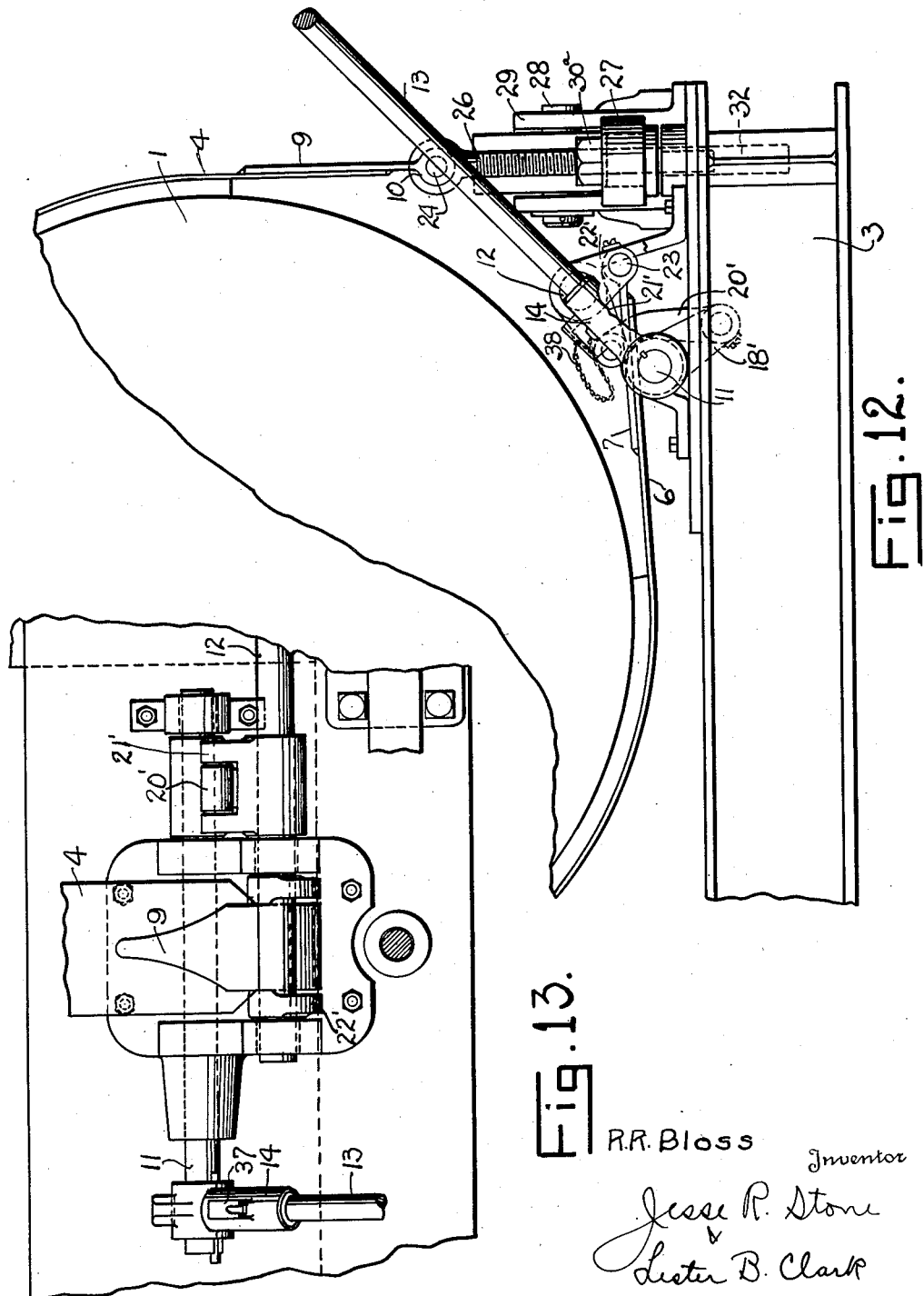

Patented Mar. 26, 1940

2,195,200

UNITED STATES PATENT OFFICE 2,195,200

BRAKE FOR DRUMS

Richard R. Bloss, Beaumont, Tex., assignor to The International Derrick & Equipment Company of Texas, Beaumont, Tex., a corporation Application June 1, 1937, Serial No. 145,758

7 Claims. (Cl. 188—77)

My invention relates to brakes to be employed in operating brake bands such as are used on drums. It is adapted for general use but is particularly designed for use on hoisting drums where cable is reeled up or unreeled in the operation of weight lifting devices.

It is an object of the invention to provide a brake band operating device which will be capable of quick and effective application.

It is my aim to provide an operating means for brake bands which will operate quickly at the time the brake band is being applied and which will exert the desired force thereon to obtain the braking effect desired.

I contemplate providing compound lever arrangement whereby the force applied through the brake lever will be greatly increased through my multiple lever construction.

I also desire to provide an arrangement of operating shafts and levers whereby the brakes may be uniformly applied and also adjusted relative to the drum to take up for wear.

I provide an arrangement whereby the brake bands may be adjusted in length when wear occurs and thus enable the operator to get uniform application of the brake at both ends of the drum.

It is a further object of the invention to provide means whereby the brake lever may be maintained in the desired position for operation at all times regardless of wear which may take place in the brakes.

My invention lies in the particular arrangement and construction of the parts making up the same, the arrangement of which will be more clearly understood from the drawings and description thereof which follows:

In the drawings, herewith,

Fig. 1 is a broken front elevation of my invention as applied to a hoisting drum.

Fig. 2 is a side view of the device with certain parts being broken away for greater clearness.

Fig. 3 is an enlarged sectional detail showing the manner in which the dead end of the brake band may be adjusted.

Fig. 4 is a broken top plan view illustrating the arrangement of the shafts and levers.

Fig. 5 is an assembly view showing the parts in their working relations.

Figs. 6 and 7 are front and side views respectively illustrating one means of attaching the operating lever to the control shaft.

Figs. 8 and 9 are front and side views, respectively, illustrating a different embodiment of means for attaching the operating lever to the shaft.

Figs. 10 and 11 are similar views illustrating a still further embodiment of lever attaching means.

Fig. 12 is a broken side view similar to Fig. 2 showing a different embodiment of the invention.

Fig. 13 is a broken top plan view of the lever mechanism shown in Fig. 12.

The brake drum 1, upon which the brake bands are employed, is shown as being mounted upon a shaft 2 which is understood as being supported in the usual manner, the supports being eliminated for purposes of clearness.

The brake drum is mounted upon a base plate 3 supported upon beams 3a, which may be steel I beams constituting the skids upon which the assembly may be moved from place to place.

The brake band itself is of the ordinary type, the band being shown at 4 equipped with the usual brake lining 5. The moving or live end of the brake band 6 is shown as connected to a clip 7, the end of which is formed with an eyelet 8 for connection with the operating mechanism. The dead end of the brake band is secured to a clip 9 having an eyelet 10 for connection with the eyebolt 26 to be later described.

The brake operating mechanism comprises a plurality of shafts including a short control shaft 11 and a longer brake operating shaft 12, it being understood that the rotation of the shaft 12 in the operation of the brakes is controlled through the movement of the control shaft 11. With reference particularly to Figs. 1 and 2, it will be seen that the control shaft 11 is below and rearwardly of the operating shaft 12. To the shaft 11 is secured a hand lever 13. Said lever is fitted within a sleeve 14 formed upon a hub 15 which is secured non-rotatably upon the shaft 11 by means of a gib key 16. At the upper end of the lever 13 is a handle 17 by which the lever may be manipulated.

Secured upon the control shaft 11 at the end remote from the lever is a bifurcated arm 18. This arm is fixed to the control shaft and is connected by means of a pin 19 to a link 20, which is pivoted upon the pin 19 and extended beneath the shaft 11 to engage with an arm 21 which is in turn secured to the operating shaft 12. As will be understood from Fig. 1, the link 20 passes beneath the shaft 11 and engages with the downwardly extending arm 21 in such manner that the movement of the arm 18 will exert a moving force upon the arm 21 of the operating shaft.

The arm 21 is fixed to the shaft 12 and acts to rotate the shaft when the lever is operated. Mounted upon the shaft 12 adjacent both ends thereof are brake band levers 22. These levers are bifurcated and the end of each lever has in its bifurcated ends a pin 23 which serves as an attachment for the eyelets 8 upon the ends of the brake band clips 7.

With this arrangement of the levers it will be understood that when the lever arm 13 is depressed by the operator from its position shown in Fig. 2 the arm 18 on the control shaft 11 will be moved rearwardly, exerting a pull through the link 20 upon the arm 21, thus moving the shaft 12 in a clockwise direction, as shown in Fig. 2. This rotation will move the arm 22 to exert a pull upon the brake bands. Due to the power increase which is possible through this particular leverage a strong force may be exerted upon the brake band to set the same.

As will be understood from both Figs. 1 and 4, there is a brake band at both ends of the drum operated through identical arrangements of levers secured to the operating shaft 12. Both brake bands will be applied simultaneously and with the same exertion of power thereon.

The dead ends 4 of the brake bands are secured in an adjustable manner so that the brakes will be applied uniformly even after wear occurs. The eyelet at the end of the clip 9 on the dead end of the brake band is secured to a pin 24 which is mounted in the bifurcated end of the clip, as will be understood from Fig. 1. The pin 24 also engages through an eyelet 25 at the upper end of a screw bolt 26 which is thus connected with the band.

The said screw bolt 26 in each band is engaged within the adjacent end of an equalizer bar 27, as will be understood best from Figs. 1 and 5. The equalizer bar is adapted to rock upon a central bearing 28 mounted between a pair of posts 29, which are bolted to the base of the frame. The trunnion or pivot pin 28 is situated midway between the two brake bands and each end of the equalizer bar has a transverse opening therethrough to receive the adjacent bolt 26, which passes freely therethrough. The opening through the equalizer bar is large enough to rotatably receive a nut 30, as will be understood from Fig. 3. The nut 30 is rotatable within the opening through the equalizer bar and has, below the bar, a radially extending flange or head 31, which prevents relative upward movement of the nut through the equalizer bar.

The nut is screwed upon the bolt 26 and by rotation permitted by a swiveling action in the end of the equalizer bar, the threaded bolt 26 may be adjusted vertically. As will be noted from Fig. 3, the base support is provided with an opening 32 downwardly therethrough to allow the movement into the base of the screw. At the lower end of the opening or socket 32 is a fluid outlet 33, shown in dotted lines in Fig. 2, to allow drainage therefrom of liquid which may find access to this recess. The upper end of the nut is formed into polygonal shape, as shown at 30a in Fig. 1, so that it may be rotated by means of a wrench as desired.

As will be understood from Figs. 1 and 4, I may hold the nut 30a against rotation by means of a forked arm 34 normally supported along the upper surface of the equalizer bar. This forked arm forms a wrench head which normally fits about the nut and prevents rotation. There is a flat handle to this arm which is secured detachably to the equalizer bar by a stud 54 on the bar extending through a slot 34 in the handle. A cotter pin in the end of the stud will prevent detachment. By means of this wrench the nut may be manipulated as desired.

This attachment of the dead end of the brake band to adjusting bolts 26 makes it possible to tighten or loosen one band or both bands as desired to obtain a uniform application of the brakes at both ends of the drum. It will be obvious that when wear occurs upon the brake lining, which has the effect of lengthening the brake band, this loosening of the band may be taken up by adjusting the dead end of the band.

While no lubricating device is shown it is contemplated that a force feed lubricating system of common construction will be employed.

In Figs. 12 and 13 I have illustrated a somewhat different arrangement of the levers connecting the operating lever with the arm which applies the brake. In this embodiment of the invention the arrangement of the dead end of the brake band is identical with that shown in the previously described embodiment. However, the levers which connect the two shafts 11 and 12 have been changed. The hand lever 13 in this embodiment is connected through means of the hub 14 to the shaft 11 in the same manner as before. Fixed upon the shaft 11 is a downwardly inclined arm 18', which is connected by means of the link 20' to the arm 21', which is fixed upon the shaft 12. As will be noted from the drawings the arm 18' extends somewhat forwardly and downwardly from the shaft 11 and the arm 21' extends rearwardly from the shaft 12. Thus the link 20' which connects the ends of these levers stands normally in a direction practically upright, the upper end of said link being curved slightly to the rear.

The brake band operating lever arm 22' extends downwardly and forwardly from the shaft 12 and is connected to the clip 7 of the live end of the brake band 6, as in the other embodiment.

In the operation of this system of lever arms the same multiplication of power is obtained. It will be seen that when the lever arm 13 is depressed it will move the arm 18' on the shaft 11 to the left of its position shown in the drawings. This will pull downwardly on the link 20' and swing the lever 21' downwardly and forwardly in a counterclockwise direction, as seen in Fig. 12. This will rotate the shaft 12 in the same direction as the lever and exert a pull upon the live end of the brake bands 6 through the arm 22'.

It will be seen that the shaft 12 in this embodiment rotates in a direction opposite to the direction of rotation of the shaft 11, in this manner differing materially from the embodiment first described.

It is desirable to arrange the operating lever 13 at an angle of approximately 45° relative to the base and the length of the lever is constructed so that the operation of the lever may be easily accomplished. To secure the lever in its proper position extending at the desired angle relative to the base, its position may be fixed prior to the adjustment of the brake band by means of a gauge which I may employ. With reference particularly to Fig. 2, it will be seen that on the rearward side of the hub 15 is an arm 36. The lower side of this arm is arranged to be exactly horizontal when the lever is in the proper position. To assist in fixing this position I provide a gauge block 37, which, as seen in Fig. 2, may normally be secured upon a small socket on the upper face of the sleeve 14 to which the lever is secured. There is a chain 38 secured to the block, and said block may be released from its socket on the lever and swung down into position resting upon the bracket within which the shaft 11 is journaled. Placed thereon it will be engaged by the lower face of the arm 36 when the lever is swung upwardly into the desired position. The brake band may be then adjusted and the lever will assume the position desired.

In Figs. 6 to 11, inclusive, I have shown means for adjusting the position of the lever arm 13 relative to the shaft 11. In Figs. 6 and 7 the sleeve 14a is mounted rotatably upon the shaft 11. It is adapted to be fixed to the shaft by engagement with an arm 39 formed upon a hub 40 keyed to the shaft 11 by the key 41. The arm 39 is adapted to fit against the flattened face 42 on the sleeve 14a and connected thereto. To accomplish this connection I provide a plurality of openings 43 transversely through the sleeve 14a to receive a bolt 44. In the arm 39 are a plurality of openings 45 which may be brought into registration with one of the openings 43 to receive the bolt and thus position the operating lever as desired. It will be understood that the bolt 44 may engage through either of the openings 43 in the sleeve and either of these openings may be brought into registration with corresponding openings in the end of the arm 39 to obtain the desired adjustment.

This adjustment may be also accomplished, as shown in Figs. 8 and 9. In this case the sleeve 14b is secured rotatably upon the shaft 11 and may be engaged with the shaft through an arm 46 keyed to the shaft 11, as in the prior modifiation. In this case the end of the arm 46 is formed with a diagonally arranged slot 47 through which a bolt 48 may extend, said bolt 48 passing through a diagonal slot 49 in the sleeve 14b. By this arrangement it will be understood that the lever arm may be adjusted as desired relative to the shaft and then fixed firmly in position by attaching the nut upon the bolt 48.

In Figs. 10 and 11 is shown another form of attachment of the sleeve 14c to the shaft 11. In this case the sleeve is rotatable on the shaft and may be secured to an arm 50 keyed to the shaft 11. The mating faces of the arm and sleeve are serrated as shown at 51 and the arm 50 is formed with an arcuate slot 52 through which the connecting bolt 53 may be extended. In this manner the angle of the lever relative to the shaft may be adjusted as desired and the nut tightened upon the bolt 53, to hold the parts in proper relative position.

The advantages of my invention lie in the fact that the operator may easily exert sufficient force upon the brake band to tighten it when the brakes are to be applied. It will be noted that the leverage becomes most powerful at the position of the lever when the brakes are contacting tightly with the brake drum. The relative positions and lengths of the various members which constitute my brake band operating mechanism are such as to provide a gradually increasing compound leverage as the hand lever is brought forward from released position which is upwardly from that shown in Fig. 1. In any given position of the hand lever, force applied is multiplied by the corresponding action of the leverage system, the resulting tension in the band being many times greater than the original force applied. It will be obvious that conversely the action of the levers is to obtain a very quick release of the bands when pressure on the hand lever is removed.

The device is simple and strong in construction and reliable and efficient in operation. It is adapted for easy adjustment and repair and will last for long periods of time without injury.

What is claimed as new is:

1. A brake band operating apparatus including a control shaft, an operating shaft parallel therewith, a brake lever on said control shaft, an oppositely extending arm on said control shaft, a downwardly extending arm on said operating shaft, a link connecting said arms, whereby the rotation of said control shaft in one direction will rotate said operating lever in the same direction, upwardly extending brake operating arms on said operating shaft, a brake band, and means connecting said brake operating arms and said brake band.

2. A brake band operating apparatus including a control shaft, an operating shaft parallel therewith, a brake lever on said control shaft, an oppositely extending arm on said control shaft, a downwardly extending arm on said operating shaft, the latter of said arms exceeding the first of said arms in length, a link connecting said arms, brake operating arms on said operating shaft, a brake band, means connecting said brake operating arms and said brake band, adapted to tighten said band when said operating shaft is rotated in the same direction as that of said control shaft, and means for adjusting the tension on said band.

3. A brake drum, a brake band thereon, an anchor for one end of said band, means to adjust the position of said anchor, a control lever pivoted adjacent the free end of said band, an operating shaft, a band-engaging arm thereon connected with the free end of said band, a relatively longer arm on said operating shaft projecting downwardly, and means on said control lever connected with said longer arm to exert a pull thereon when said control lever is moved, and thus rotate said operating shaft in the same direction as said control shaft to set said brake band.

4. In a brake drum installation, a brake band upon said drum, means to anchor one end of said band, a control shaft, a control lever on said control shaft, a short arm on said control shaft, an operating shaft, an arm on said operating shaft, connected with the free end of said brake band, an approximately oppositely extending arm on said operating shaft, and means connecting said short arm on the control shaft with said oppositely extending arm on said operating shaft to rotate said operating shaft in a direction the same as that of said control shaft when said control shaft is rocked but to a lesser extent.

5. In a brake operating device, a brake band, a control shaft, a brake operating shaft parallel therewith, a lever arm on said operating shaft engaging said brake band, a hand lever on said control shaft, means to fix said hand lever to said control shaft, means connecting said control shaft operatively with said brake operating shaft to rotate the same, a gauge arm on said hand lever, a supporting plate fixed adjacent thereto, and means to engage between said arm and said plate to gauge the angular position of said hand lever and said control shaft.

6. A supporting plate, bearings thereon, a control shaft in said bearings, a hand lever, a hub thereon fixed to said shaft, a gauge arm fixed on said hub, and a gauge block formed to fit between said arm and said plate and determine the angular position of said lever and shaft in said bearings.

7. A brake band operating device including a control shaft, a separate operating shaft parallel therewith, a forwardly and downwardly inclined arm fixed on said control shaft, a rearwardly inclined arm on said operating shaft of greater length than that of said first named shaft, a link connecting said arms, a brake band operating arm on said operating shaft, and manually controlled means to rotate said control shaft and operate said brake.

RICHARD R. BLOSS.